United States Patent [19]

Sahashi et al.

[11] Patent Number: 5,628,570
[45] Date of Patent: May 13, 1997

[54] WHEEL-SUPPORTING BEARING

[75] Inventors: Koji Sahashi, Mie; Keizo Kobayashi, Iwata, both of Japan

[73] Assignee: NTN Corporation, Osaka, Japan

[21] Appl. No.: 548,518

[22] Filed: Oct. 26, 1995

[30]  Foreign Application Priority Data

Oct. 27, 1994 [JP] Japan ................. 6-263769

[51] Int. Cl.⁶ ................. F16C 19/08; G01P 3/44
[52] U.S. Cl. ................. 384/448; 324/207.25
[58] Field of Search ............. 384/448; 324/174, 324/207.12, 207.25

[56]  References Cited

U.S. PATENT DOCUMENTS

| | | | |
|---|---|---|---|
| 5,381,090 | 1/1995 | Adler et al. | 384/448 X |
| 5,388,916 | 2/1995 | Ohtsuki et al. | 384/448 |
| 5,434,503 | 7/1995 | Rigaux et al. | 324/207.25 X |
| 5,438,260 | 8/1995 | Rigaux et al. | 384/448 X |
| 5,470,157 | 11/1995 | Dougherty et al. | 384/448 |

*Primary Examiner*—Thomas R. Hannon
*Attorney, Agent, or Firm*—Wenderoth, Lind & Ponack

[57]  ABSTRACT

A wheel-supporting bearing has a built-in rotation sensor which can be manufactured at low cost and which is high in mechanical strength and sealing capability at the joint portion between the rotation sensor and a harness. The rotation sensor, which is fixed to the inner ring, is made up of a stator formed by pressing, and a coil wound inside the stator. An annular plate is coupled to the back of the stator. A resin molding is fixed to the annular plate. A lead extending from the coil is connected to the harness in the resin molding. The lead is covered with a resin sleeve and surrounded by seal rings to reinforce and seal the joint portion between the lead and the harness.

16 Claims, 4 Drawing Sheets

WHEEL-SUPPORTING BEARING

BACKGROUND OF THE INVENTION

This invention relates to a wheel-supporting bearing having a built-in rotation sensor for detecting the wheel speed.

Unexamined Japanese Patent Publication 5-264562 discloses a wheel-supporting bearing including a rotation sensor for use with an antilock brake system (ABS).

Referring to FIGS. 5 and 6, the bearing proposed in this publication comprises a rotary bearing ring (outer ring) 41, a sensor rotor 43 mounted on the outer ring 41 for producing a magnetic field, a stationary bearing ring (inner ring) 42, and a rotation sensor 44 mounted on the inner ring 42, opposite to the sensor rotor 43. A seal member 45 is provided to seal the space between the outer peripheral surface of the rotation sensor 44 and the end of the outer ring 41.

The rotation sensor 44 comprises a stator 46 in the form of an annular case, and a coil 48 wound in an annular groove 47 formed in the stator 46. The stator 46 has a plurality of teeth 49 and 50 each corresponding to respective magnetic poles formed on the sensor rotor 43.

The stator 46 is formed by casting or by cold-forging a magnetic material such as metal. It is adapted to form a magnetic circuit around the coil 48 to produce an electromotive force by guiding a magnetic flux from the sensor rotor 43. The stator 46 has on its inner periphery an integral flange 51. When press-fitting the rotation sensor 44, the flange 51 serves as a stopper by abutting the end face of the bearing ring 42.

But mass-producing such stators by casting or forging requires a long time and high cost.

The voltage produced in the coil 48 has to be taken out. In the structure proposed in the above publication, the rotation sensor 44 is exposed to a rather harsh environment. It is therefore difficult to completely seal the joint portion between the lead extending from the coil 48 and the harness. If water leaks along the lead into the stator 46, or if the joint portion rusts, the sensor may suffer a drop in the output voltage or other trouble.

When mounting the rotation sensor 44 on the bearing ring 42, or otherwise handling it, undue external force may be applied to the joint portion between the lead extending from the coil and the harness. Thus, it is necessary to connect the lead to the harness with sufficient strength so that the joint portion can withstand such an external force.

An object of this invention is to provide a wheel-supporting bearing having a rotation sensor which can be manufactured at low cost and having a simple and strong structure for connecting the rotation sensor to the harness while providing a perfect seal at the joint portion therebetween.

SUMMARY OF THE INVENTION

According to the present invention, there is provided a wheel-supporting bearing comprising a rotatable bearing ring, a stationary bearing ring, a sensor rotor mounted on the rotatable bearing ring for detecting the rotating speed of the rotatable bearing ring, a rotation sensor mounted on the stationary bearing ring so as to be opposite to the sensor rotor, an annular case having a ⊐-shaped section for mounting the rotation sensor therein, an annular plate fixed to an outer end of the annular case, a resin molding mounted on the annular plate with the annular plate partially embedded in the resin molding, a lead wire extending from the rotation sensor, the annular case and the annular plate having holes through which the lead wire extends, and a harness to which the lead wire is connected in the molding.

The sensor rotor may have a magnetized ring having opposite magnetic poles alternately arranged in a circumferential direction. In this case, as the annular case, a stator formed of a magnetic material is used, the rotation sensor comprising this stator and a coil mounted in the stator.

Preferably, the lead wire is covered with a resin sleeve inserted through the holes formed in the annular case and the annular plate, the sleeve being embedded in the molding in a pressurized state. Also, it is preferable to provide a seal ring or seal material at the boundary between the annular case and the annular plate so as to surround the sleeve.

In one arrangement, part of the annular plate is bent toward and into the molding so that the bent portion is embedded closely in the molding.

In another arrangement, the annular plate is partially in abutment with the stationary bearing ring, thereby positioning the rotation sensor in an axial direction.

In still another arrangement, the annular plate has a center hole defined by a surface having a flat portion. A shaft having a flat surface complementary to the flat portion is inserted through the center hole so that the flat surface engages the flat portion, thereby preventing the shaft from turning in the center hole.

Since the lead is connected to the harness in the molding, it is possible to positively prevent water or other foreign matter from entering the joint portion between the lead and the harness.

Since the rotation sensor and the molding are mounted on the annular plate, the strength of the annular case housing the rotation sensor need not be so high. Thus, it is possible to form the annular case (stator) by pressing.

By covering the lead with the sleeve and sealing the boundary between the annular case and the annular plate, it is possible to perfectly seal the joint portion between the lead and the harness, and to increase the mechanical strength of the joint portion.

By bending and embedding part of the annular plate, the molding is strongly fastened to the annular plate, so that the molding is least likely to rotate relative to the annular plate.

Any excess external force that may be applied to the sensor is borne by the bent portion of the annular plate, so that the joint portion between the lead and the harness is less likely to be broken.

By using the annular plate to non-rotatably set the rotation sensor in a predetermined position, it is possible to simplify the shape of the annular case and to position the sensor with higher accuracy.

Other features and objects of the present invention will become apparent from the following description made with reference to the accompanying drawings, in which:

DETAILED DESCRIPTION OF THE PREFERRED EMBODIMENT

Figure 1:
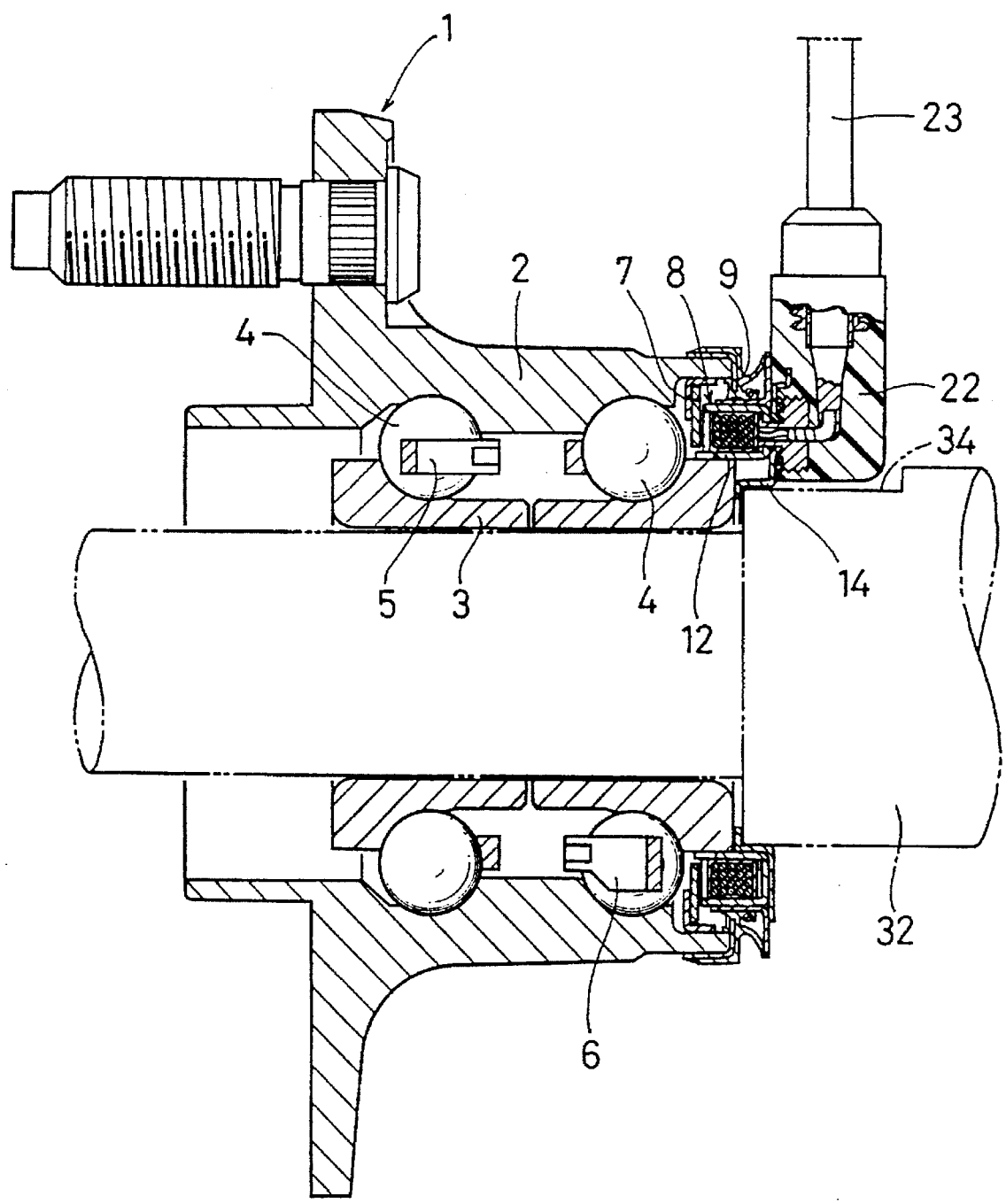
FIG. 1 is a vertical sectional view of a wheel-supporting bearing of an embodiment.
Figure 2:
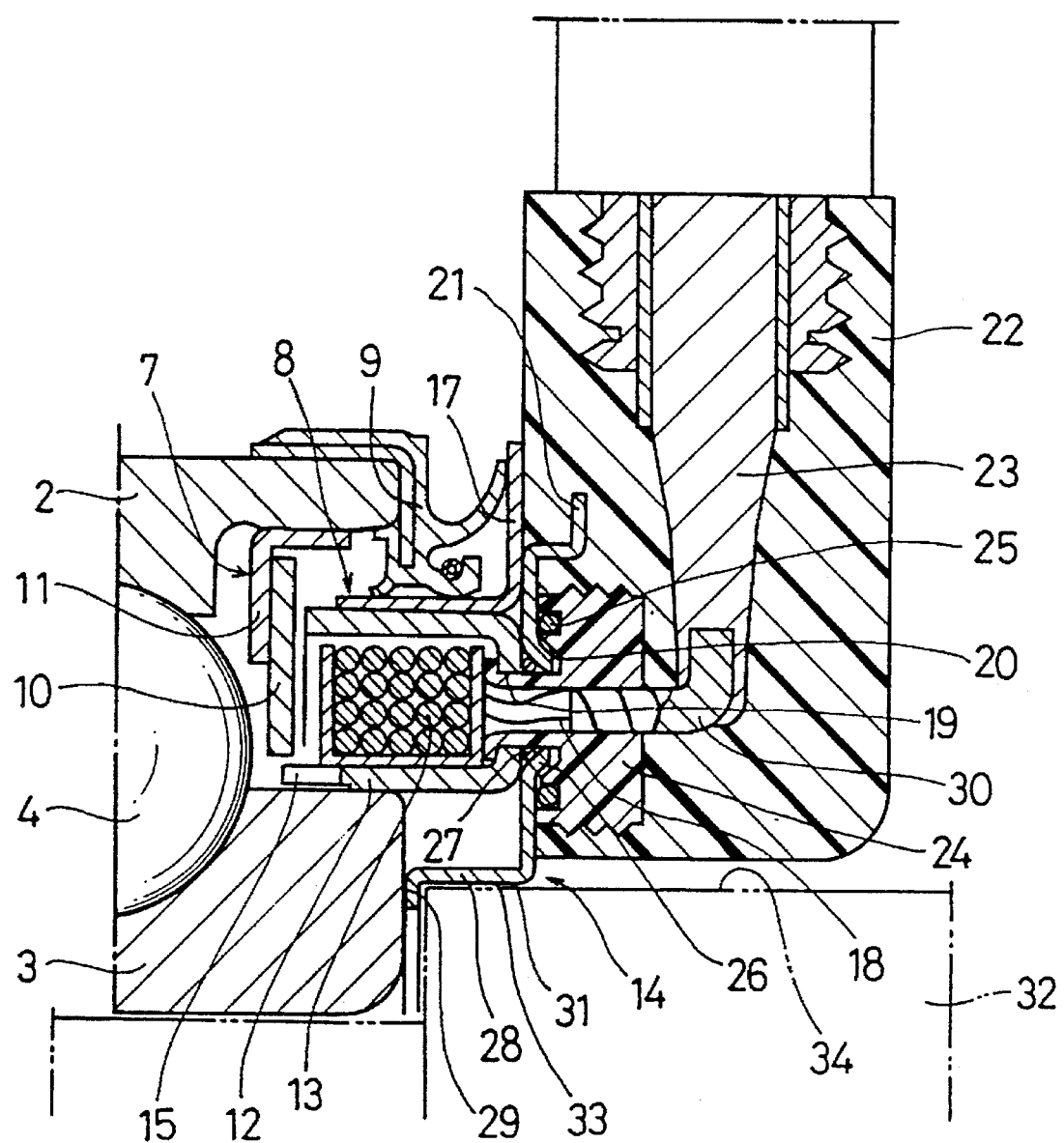
FIG. 2 is a partial enlarged vertical sectional view of the bearing of FIG. 1.
Figure 3:
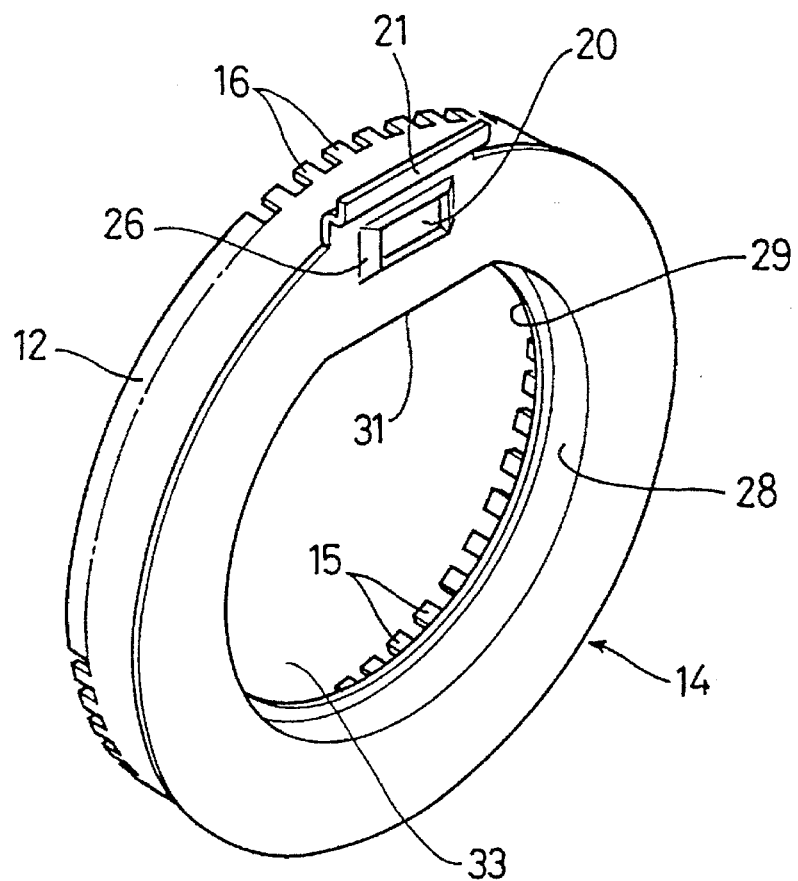
FIG. 3 is a perspective view of the stator and the annular plate.
Figure 4:
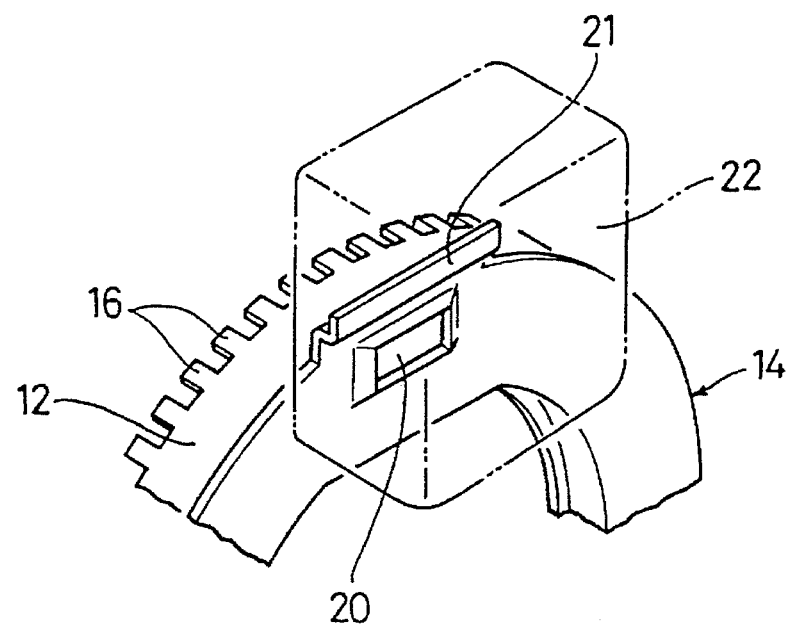
FIG. 4 is a perspective view showing the joint portion between the annular plate and the molding.
Figure 5:
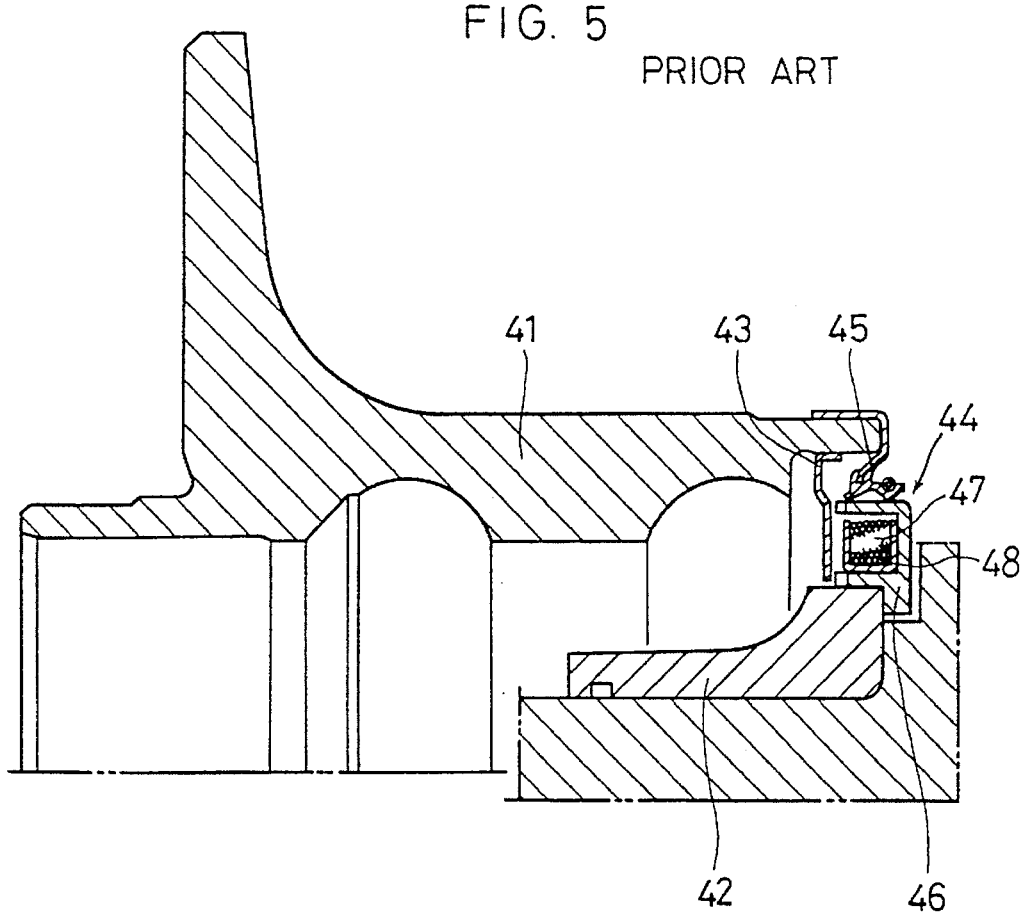
FIG. 5 is a vertical sectional view of a conventional bearing.
Figure 6:
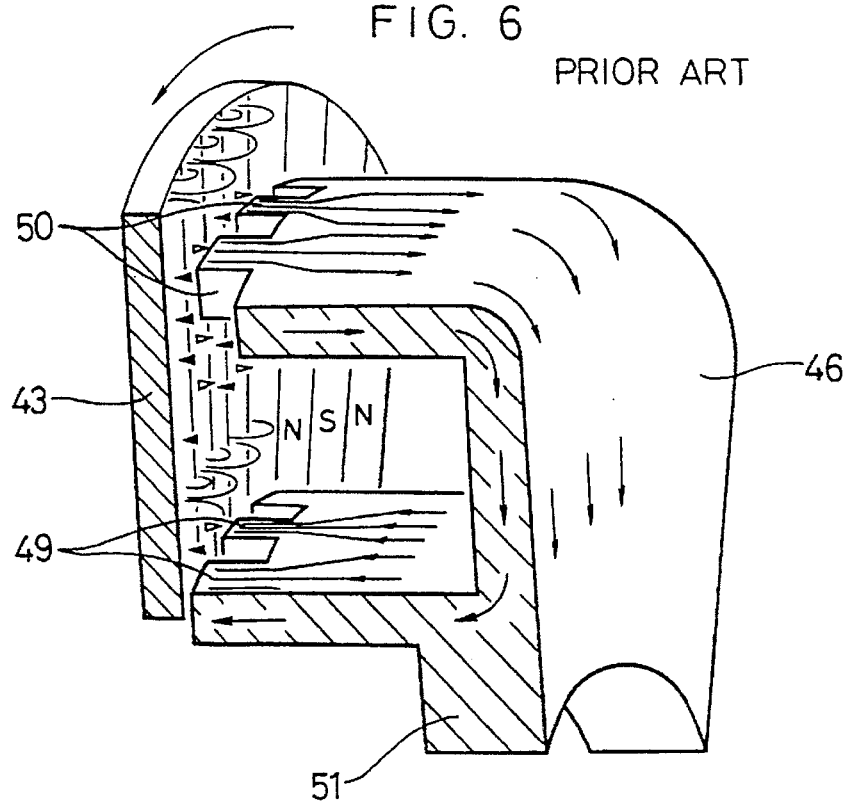
FIG. 6 is a vertical sectional view of the stator of the bearing of FIG. 5.

FIGS. 1 and 2 show the wheel-supporting bearing of an embodiment of the present invention.

In the embodiment, an outer ring 2 is integral with and rotatable in unison with a wheel-carrying hub 1.

An inner ring 3 as a stationary race ring is comprised of two separate members. Balls 4 are arranged in two rows between the outer and inner rings 2 and 3, and held in position by cages 5 and 6.

A sensor rotor 7 for detecting the rotating speed of the wheel is mounted on one end of the outer ring 2. A rotation sensor 8 is mounted on this end of the inner ring 3, opposite to the sensor rotor 7. An oil seal 9 is provided between the rotation sensor 8 and the end of the outer ring 2.

The sensor rotor 7 is comprised of a magnetized ring 10 having N- and S-poles alternately arranged in a circumferential direction, and a press-fit ring 11 welded or otherwise fixed to the magnetized ring 10. The ring 11 is press-fitted in the outer ring 2.

The rotation sensor 8 comprises an annular case or stator 12 having a ⊐-shaped section, and a coil 13 wound in the stator 12. An annular plate 14 is fixed to the outer side of the stator 12.

The stator 12 is a one-piece member formed by pressing a magnetic material such as a metal plate. It is press-fitted onto the inner ring 3.

The stator 12 has, along its inner- and outer-diameter edges, a plurality of axial teeth 15 and 16 opposite to magnetic poles formed on the magnetized ring 10. The inner and outer teeth 15 and 16 are provided circumferentially displaced from each other so that while the inner teeth 15 face one of the two opposite magnetic poles, the outer teeth 16 will face the other magnetic pole.

A seal ring 17 having an L-shaped section is fixedly mounted on the outer periphery of the stator 12. An oil seal 9 has its lips in slide contact with the seal ring 17.

An annular plate 14 is formed by pressing a metal plate as with the stator 12. It is welded or otherwise fixedly mounted on the outer periphery of the stator 12 so that it is coaxial with the stator.

A lead 18 connected to the coil 13 is pulled out through holes 20 and 19 formed in the end walls of the annular plate 14 and the stator 12, respectively. The annular plate 14 has an outwardly projecting L-shaped flange 21 along its outer circumference at the portion radially outside the hole 20.

A molding 22 of a heat-resistant resin is formed at the outer side of the annular plate 14, the flange 21 being embedded in the molding 22. The molding 22 extends a predetermined length in the circumferential direction. One end of an external harness 23 is inserted into the molding 22 through its outer periphery.

A resin sleeve 24 is inserted through the holes 20 and 19 of the annular plate 14 and the stator 12 into the stator. The end of the lead 18 connected to the coil 13 is wound in the sleeve 24 around a conductor 30 and connected to the harness 23 in the molding 22.

The resin sleeve 24 covers substantially entirely the lead 18 and the conductor 30. The molding 22 is formed with the sleeve 24 fitted in the holes 19, 20 so that the sleeve is embedded in the molding. By forming the molding 22 around the sleeve 24, the sleeve is collapsed and pressed against the outer surface of the annular plate 14 and the lead 18.

A seal ring 25 is disposed between the annular plate 14 and the sleeve 24 so as to surround the hole 20. It provides a seal between the sleeve 24 and the annular plate 14.

A ridge 26 is formed on the outer end face of the annular plate 14 along the edge of the hole 20. A seal ring 27 is provided between the ridge 26 and the stator 12 so as to surround the sleeve 24. It prevents the entry of water and dust through the gap between the annular plate 14 and the stator 12.

Further, the annular plate 14 has a center hole 33 through which a fixed shaft 32 extends. The hole 33 is defined by a portion 28 extending axially along the inner periphery of the stator 12 and an inner end portion as a stopper 29 that abuts the end face of the inner ring 3. The stopper 29 determines the axial position of the rotation sensor 8 relative to the bearing.

The portion 28 has a flat surface 31. The fixed shaft 32 has a flat portion 34 complementary to the flat surface 31. The shaft 32 is inserted in the inner ring 3 so that its flat portion 34 engages the flat surface 31. Thus, the annular plate 14 (and thus the rotation sensor 8) is prevented from rotating.

Now in operation, when the outer ring 2 rotates with the wheel, the sensor rotor 7 rotates with the outer ring 2, so that the magnetic field produced by the magnetic poles of the magnetized ring 10 also rotates. Namely, N- and S-poles alternately pass the inner and outer teeth 15, 16 of the stator 12, producing an alternating field in the stator 12, which in turn produces an electromotive force in the coil 13. The electromotive force thus produced is taken out through the lead 18 and the harness 23 and converted to a pulse signal which can be used to calculate the wheel rotating speed.

Since the stator 12 and the annular plate 14 are each formed by pressing a plate member, the rotation sensor of the embodiment can be manufactured at low cost.

By embedding the flange 21 of the annular plate 14 in the molding 22, and surrounding the lead 18 extending from the coil 13 with the sleeve 24 and the seal rings 25 and 27, it is possible to protect the sensor from external force and water and dust and improve the mechanical strength and waterproofness of the joint portion between the lead 18 and the harness 23.

The annular plate 14 prevents the body of the rotation sensor 8 from turning and holds it in a predetermined axial position. Thus, the rotation sensor can be set in position accurately and reliably. The stopper 29 prevents the size of the gap between the sensor rotor and the stator 12 from changing even under a large external force that may be applied to the rotation sensor 8. This is helpful in protecting the rotation sensor.

While we have described a bearing of the type in which the outer ring is rotatable, the concept of the present invention is equally applicable to a bearing in which its inner ring is rotatable.

In the above embodiment, the rotation sensor is of the type comprising a stator and a coil and capable of taking out the alternating field produced by the sensor rotor in the form of an electromotive force. But instead, an optical sensor for detecting rotating speed by receiving light reflected from the sensor rotor may be used. In this case, the optical sensor comprising a light emitter and a light interceptor may be housed in the annular case formed by pressing.

What is claimed is:

1. A wheel-supporting bearing comprising a rotatable bearing ring, a stationary bearing ring, a sensor rotor mounted on said rotatable bearing ring, a rotation sensor mounted on said stationary bearing ring so as to be opposite to said sensor rotor for detecting the rotating speed of said rotatable bearing ring, an annular case having a ⊐-shaped section for mounting said rotation sensor therein, an annular plate fixed to an outer end of said annular case, a resin molding mounted on said annular plate with said annular plate partially embedded in said resin molding, a lead wire extending from said rotation sensor, said annular case and said annular plate having holes through which said lead wire extends, and a harness to which said lead wire is connected in said molding.

2. A wheel-supporting bearing as claimed in claim 1 wherein said sensor rotor has a magnetized ring having opposite magnetic poles alternately arranged in a circumferential direction, wherein said annular case is a stator formed of a magnetic material, and wherein said rotation sensor comprises said stator and a coil mounted in said stator.

3. A wheel-supporting bearing as claimed in claim 2, wherein said lead wire is covered with a resin sleeve inserted through said holes formed in said annular case and said annular plate, said sleeve being embedded in said molding in a pressurized state, and wherein a seal ring is provided at the boundary between said annular case and said annular plate so as to surround said sleeve.

4. A wheel-supporting bearing as claimed in claim 2, wherein part of said annular plate is bent toward said molding so that the bent portion is embedded closely in said molding.

5. A wheel-supporting bearing as claimed in claim 2, wherein said annular plate is partially in abutment with said stationary bearing ring, thereby positioning said rotation sensor in an axial direction.

6. A wheel-supporting bearing as claimed in claim 2, wherein said annular plate has a center hole defined by a surface having a flat portion, and wherein a shaft having a flat surface complementary to said flat portion is inserted through said center hole so that said flat surface engages said flat portion, thereby preventing said shaft form turning in said center hole.

7. A wheel-supporting bearing as claimed in claim 1, wherein said lead wire is covered with a resin sleeve inserted through said holes formed in said annular case and said annular plate, said sleeve being embedded in said molding in a pressurized state, and wherein a seal ring is provided at the boundary between said annular case and said annular plate so as to surround said sleeve.

8. A wheel-supporting bearing as claimed in claim 7, wherein part of said annular plate is bent toward said molding so that the bent portion is embedded closely in said molding.

9. A wheel-supporting bearing as claimed in claim 7, wherein said annular plate is partially in abutment with said stationary bearing ring, thereby positioning said rotation sensor in an axial direction.

10. A wheel-supporting bearing as claimed in claim 7, wherein said annular plate has a center hole defined by a surface having a flat portion, and wherein a shaft having a flat surface complementary to said flat portion is inserted through said center hole so that said flat surface engages said flat portion, thereby preventing said shaft form turning in said center hole.

11. A wheel-supporting bearing as claimed in claim 1, wherein part of said annular plate is bent toward said molding so that the bent portion is embedded closely in said molding.

12. A wheel-supporting bearing as claimed in claim 11, wherein said annular plate is partially in abutment with said stationary bearing ring, thereby positioning said rotation sensor in an axial direction.

13. A wheel-supporting bearing as claimed in claim 11, wherein said annular plate has a center hole defined by a surface having a flat portion, and wherein a shaft having a flat surface complementary to said flat portion is inserted through said center hole so that said flat surface engages said flat portion, thereby preventing said shaft form turning in said center hole.

14. A wheel-supporting bearing as claimed in claim 1, wherein said annular plate is partially in abutment with said stationary bearing ring, thereby positioning said rotation sensor in an axial direction.

15. A wheel-supporting bearing as claimed in claim 14, wherein said annular plate has a center hole defined by a surface having a flat portion, and wherein a shaft having a flat surface complementary to said flat portion is inserted through said center hole so that said flat surface engages said flat portion, thereby preventing said shaft form turning in said center hole.

16. A wheel-supporting bearing as claimed in claim 1, wherein said annular plate has a center hole defined by a surface having a flat portion, and wherein a shaft having a flat surface complementary to said flat portion is inserted through said center hole so that said flat surface engages said flat portion, thereby preventing said shaft form turning in said center hole.

* * * * *